United States Patent [19]
Marquez-Lucero et al.

[11] Patent Number: 5,574,377
[45] Date of Patent: Nov. 12, 1996

[54] DEVICE FOR THE DETECTION AND LOCALIZATION OF ORGANIC SOLVENT LEAKAGES AND FABRICATION PROCESS

[76] Inventors: Alfredo Marquez-Lucero, Daniel Delgadillo #99, 54050 Vista Bella, Tlalnepantla, Edo. de Mex. C.P.; Pedro Fuentes-Riquelme, Calle 57 # 324, Villas de la Hacienda, Mérida, both of Mexico

[21] Appl. No.: 288,458

[22] Filed: Aug. 10, 1994

[51] Int. Cl.⁶ .............................. G01R 31/11; G01M 3/04
[52] U.S. Cl. .................. 324/533; 324/525; 324/534; 324/544; 324/557; 340/605; 73/40; 174/11 R
[58] Field of Search .................... 73/40, 40.5 R; 174/11 R; 200/61.04; 324/525, 533, 534, 541, 544, 555, 557, 693, 698; 340/605

[56] References Cited

U.S. PATENT DOCUMENTS

| | | | |
|---|---|---|---|
| 3,981,181 | 9/1976 | Ochiai | 324/534 |
| 4,206,632 | 6/1980 | Suzuki | 73/40.5 R |
| 4,487,057 | 12/1984 | Lutz | 324/519 |
| 4,896,527 | 1/1990 | Akiba | 324/664 |
| 5,173,684 | 12/1992 | Ijiri et al. | 73/40 |
| 5,177,996 | 1/1993 | Sahakian | 324/533 |
| 5,378,995 | 1/1995 | Kudo et al. | 324/693 |
| 5,410,255 | 4/1995 | Bailey | 324/525 |
| 5,514,338 | 5/1996 | Simon et al. | 340/605 X |

*Primary Examiner*—Kenneth A. Wieder
*Assistant Examiner*—Glenn W. Brown
*Attorney, Agent, or Firm*—Dominik & Stein

[57] ABSTRACT

A device for detection of the presence of organic solvents, and a process for the fabrication of the device. This device is particularly useful as a device for the detection and localization of organic solvent leaks, and more particularly to the detection and control of liquid hydrocarbon leaks. In a preferred embodiment the device comprises the combination of a time domain reflectometer and a cable comprised of a composite material constituted of a solvent soluble or swellable thermoplastic matrix containing conductive particles in such a proportion that the whole composite becomes a conductor. Contact with the solvent to be detected causes the matrix to dissolve or swell, which brings about a change in the conductivity of the cable which can be detected by the reflectometer.

15 Claims, 9 Drawing Sheets

DEVICE FOR THE DETECTION AND LOCALIZATION OF ORGANIC SOLVENT LEAKAGES AND FABRICATION PROCESS

FIELD OF THE INVENTION

The present invention relates to a new device for detection of the presence of organic solvents, and to a process for the fabrication of the device. This device belongs generally to the field of industrial security systems, particularly to systems for the detection and control of organic solvent leaks, and more particularly to the detection and control of liquid hydrocarbon leaks.

DESCRIPTION OF THE RELATED ART

Several solvent responsive signal-carrying devices have been reported in the literature. In these devices the main signal conducting material is two or more metal conductors, and the detection of solvent leaks is based on the induction of a short circuit between the metal conductors.

However, the care required to manufacture such cables is high, and so the cost of the system is relatively high.

Accordingly, there is a need for a system and device for detecting and localizing organic solvent leaks as soon as the leaks occur, which system and device are comparatively easy to manufacture, inexpensive, and reliable.

It is an object of the present invention to provide such a system and device.

SUMMARY OF THE INVENTION

The present inventors have studied the known solvent responsive signal-carrying devices, and the problems associated therewith, and have developed a completely new system and device which makes possible not only the detection, but also the localization, of organic solvent leaks. The structural feature which distinguishes the present innovation from the known devices is the main signal conducting material, which is a polymeric composite material rather than the conventionally employed two or more metal conductors. Thee detection and localization of solvent leaks is based on a decrease of electrical conductivity of this composite material when it comes into contact with the spilled solvent, instead of the induction of a short circuit between metal conductors.

Also, because the fabrication procedure is based on a simple coextrusion of the polymeric composite and preferably also a protective porous jacket, it is easier to manufacture and cheaper than other devices.

A device suitable to be used as an organic solvents leakage detector in an industrial security system for the chemical and petrochemical industries is described below. This device employs a cable comprised of a material which, in normal conditions, is capable of conducting an electric signal. However, when the signal conducting material comes into contact with a leaking organic solvent such as gasoline, its conductivity is locally diminished or abrogated. This device, which for brevity is sometimes hereafter referred to as "Organic Solvent Leakage Detector" or "OSLEADER", uses a flexible cable (OSLEADER cable) constituted primarily of a composite material formed by a solvent soluble or swellable thermoplastic matrix containing conductive particles in such a proportion that the whole composite becomes a conductor. The composite is jacketed by a material of a porous nature, which enhances its mechanical properties and also protects it from the environment. If desired, the cable can also be further internally reinforced with synthetic or metallic fibers.

The basic principle (although not the only one) for the detection of organic solvent leaks using this device is the following: The signal conducting cable is positioned adjacent to the object to be monitored, such as a pipe line or containers which transport or store organic solvents (such as gasoline). With the help of electronic systems (e.g., reflectometers) readily available in the market, electric signal pulses can be sent continuously along the signal conducting cable. The time that the echo of these signals takes to return to the point of emission, when the pipelines or containers are intact, can be measured and calibrated for each one of these lines. In the event of the appearance of a small leak, the spilled solvent will come into contact with the OSLEADER cable, causing the solvent swellable or soluble matrix to swell or dissolve, whereupon the conductive particles in the matrix lose contact with each other, and causing the composite to diminish or lose its electrical conductivity, so that the echo of these signals returns to the point of departure in less time (due to the fact that the electric pulse has less distance to travel).

This phenomenon can be used for the early detecting and warning of leaks and also for the precise localization of the leak position (simply by relating the time of the return of echo, once the leak has been detected, with the time previously calibrated).

The foregoing has outlined rather broadly the more pertinent and important features of the present invention in order that the detailed description of the invention that follows may be better understood and so that the present contribution to the art can be more fully appreciated. Additional features of the invention, which will be described hereinafter, will form the subject of the claims of the invention. It should be appreciated by those skilled in the art that the conception and the specific embodiments disclosed may be readily utilized as a basis for modifying or designing other devices and systems for detecting and localizing leakages or for carrying out the same purposes of the present invention. It should also be realized by those skilled in the art that such equivalent structures do not depart from the spirit and scope of the invention as set forth in the appended claims.

BRIEF DESCRIPTION OF THE DRAWING

For a fuller understanding of the nature and objects of the present invention reference should be made the following detailed description taken in with the accompanying drawings in which.

DESCRIPTION OF THE PREFERRED EMBODIMENTS

Figure 1:
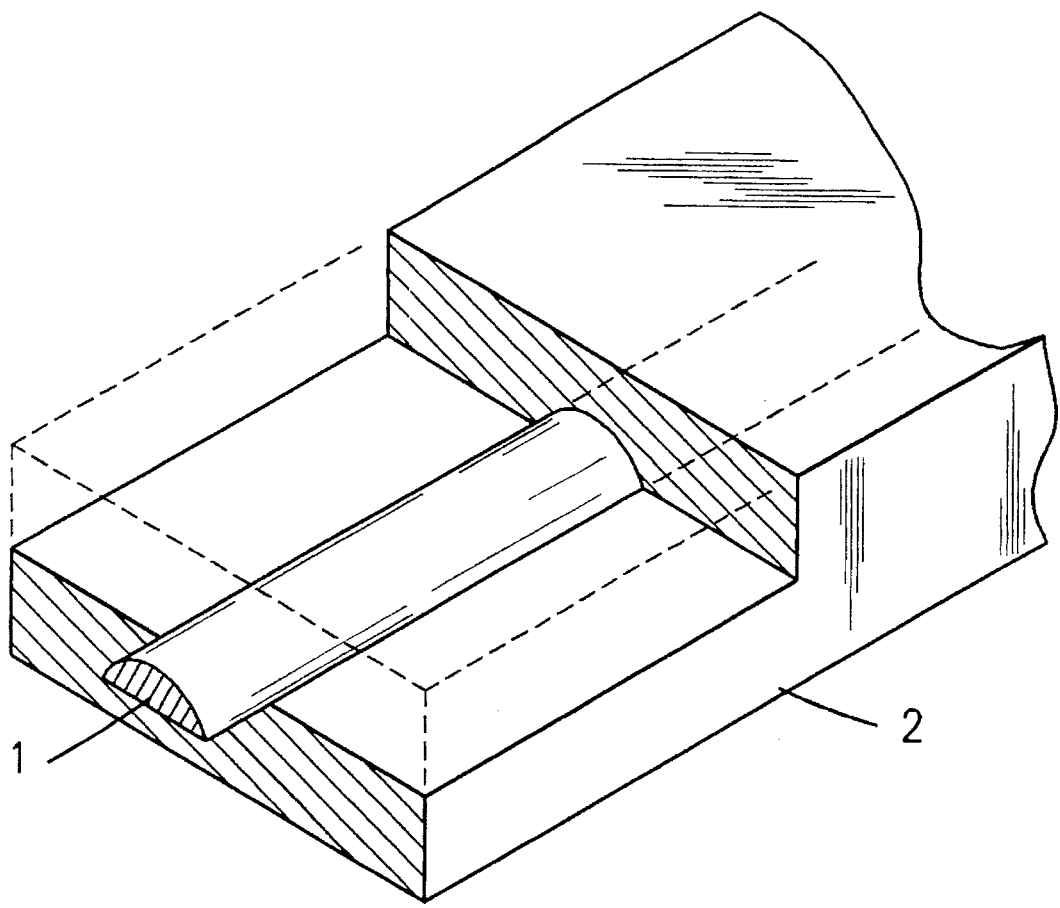
FIG. 1 is a diagonal elevated view of a rectangular cross-sectional signal carrying composite cable according to the present invention.

The present invention is based upon the discovery that problems associated with conventional solvent monitoring devices can be overcome, production costs can be reduced, and improvements in detection and localization of leaks can be achieved by the use of the composite signal carrying cable as described herein in combination with a conventional monitoring system such as a reflectometer type system.

Reflectometers are well known in the electronic industry for testing metal wires, such as electrical cables used in computer networks. Reflectometers generate a test signal which is transmitted to a cable to be tested. The cable then generates a reflection of the test signal and transmits the reflection back to the reflectometer. Impedance faults in the cable also generate a reflection. The reflectometer senses the reflections, and displays them on an oscilloscope. The oscilloscope display thus reveals the impedance faults along the length of the cable, and enables the operator to determine the impedance signature of the cable under test.

The use of electrical echoes to localize imperfections in electrical wiring is frequently referred to as "time domain reflectometry" or "digital time domain reflectometry", and suitable examples of equipment for time domain reflectometry are Models 1502, 1503 and 1503C produced by Tektronix, Inc. of Beaverton, Oregon, the operation of which is described in the operation manual (e.g., Manual 070-7323-01). Patents which employ or discuss this technique include U.S. Pat. Nos. 4,538,103, 4,739,276, 4,766,386, 4,914,394, 4,996,654, 4,970,466, 5,057,783, and 5,185,594.

Although the cable of the present invention can be connected to other equipment for monitoring changes in signals such as for monitoring for reduction in conductivity, the use of reflectometry as discussed above is preferred since the measurement of the electrical echo (or time domain reflectometry) allows the determination of the location of a leak in, e.g., a pipeline or gas station, with very good precision.

The flexible OSLEADER cable of the present invention is one which in normal conditions is capable of conducting an electric signal, but in which conductivity is locally diminished or even abrogated once in contact with organic solvents such as gasoline.

The OSLEADER cable is constituted primarily by a composite material formed by a thermoplastic matrix filled with electrically conducting particles in such a proportion that the whole composite material becomes a conductor. The polymeric matrix must be chosen from among the polymers that dissolve or swell in the presence of the organic solvents to be detected.

The physical principle of operation of the OSLEADER device is as follows: Polymers and organic solvents are usually excellent electrical insulators; however, it is possible to make up polymeric composites with a relatively good electrical conductivity by adding conductive particles to the polymer matrix at concentrations above a threshold value called "the electrical percolation concentration." If the particle concentration falls below this value, the composite material becomes an electrical insulator. For each organic solvent utilized in the industry there is at least one polymer capable of absorbing it by a dissolution or swelling process. Hence, by choosing a polymer matrix with high affinity for the solvent to be detected, it is possible to construct a conducting polymeric composite using this matrix that absorbs the solvent when they come into contact. This solvent absorption causes a decrease of the overall conducting particles concentration in the composite, causing the subsequent decrease of its electrical conductivity. Furthermore, the decline of the composite material conductivity can be enhanced if the concentration of the conducting particles is close to the percolation threshold, preferably having a conductive particle composition 10 percent by weight higher than the percolation threshold.

As non-limiting examples of polymers which may be used as the soluble or swellable matrix, mention may be made of synthetic rubbers, silicone rubber, Tygon R (manufactured by Celanese Mexicana), polyvinyl chloride, polymethyl methacrylate., polybutadiene, polytetrafluoroethylene. Preferred among these is silicone, polybutadiene, and polytetrafluoroethylene.

As electrically conducting particles there may be utilized carbon black, graphite, silver, gold, bronze, brass, nickel, sponge irons and electrolytic irons (obtainable from Glildden Metals, SCM Corporation, 900 Union Commerce Bldg., Cleveland Ohio 44115) stainless steel, zinc, copper, and conductive metal salts (e.g., cuprous iodide) and the like, or mixtures thereof.

In order to obtain a maximum conductivity and a good processability of the composite, the packing volume fraction of the conductive particles in the composite must be as high as possible, and a high packing volume fraction can be obtained using, e.g., the technique developed by R.K. McGeary (J.Amer. Ceramic Soc., 44 513, 1961). This technique is based on the principle that a higher packing volume fraction of a binary mixture can be obtained when the particles are aggregated to the polymeric matrix in two different sizes, the first one being at least 80 times larger than the other. It is preferred that the particles are added to the matrix in such a proportion that their final volumetric fractions in the composite be about 0.6 to 0.7, and preferably very close to 0.625, for the larger particles, and about 0.2 to 0.3, preferably very close to 0.235, for the smaller particles, with a total particle packing of 0.86 and a polymeric volume fraction of 0.14. Of course, this proportion of particles and polymer is based upon the theoretical maximum of 1.0 as the total volumetric packing fraction. In practice, it is difficult to attain such a high packing density, and in fact, it is not necessary. Typically, in practice, the percolation concentration is determined (typically situated at a particle volumetric fraction of about 0.5 to 0.6) and to this is added at least 10% by weight more of the conductive particles. Then, if the mechanical properties of the composition are not spoiled by the high concentration of particles, particles are added to increase the particle content, with the ratio of large to small particles added always being the same (0.625/0.235=2.66) for the maximum packing concentration.

Suitable sizes for the large particles is 200 microns or less, and for the small ones is 2.5 microns or less.

In order to incorporate the particles into the matrix it is desirable to first dissolve the matrix in a good solvent, such as ethylinic ether or naphthas for the polybutadiene, using a mechanical mixer. If metallic particles are utilized, it is highly desirable to descale them prior to aggregating into the mix. If carbon black is to be utilized, the best results are obtained by mixing the particles into the matrix very gently in order to preserve the internal structure of the carbon black. The particles may be first wetted with the solvent, or may be directly incorporated gradually into the polymer to obtain a homogeneous mixture. Thereafter the solvent is evaporated, and the conductive composite thus obtained is preferably pelletized prior to extrusion.

Finally, in order to obtain a cable having good flexibility and weather resistance properties, it is important to incorporate a small amount of cross-linking agent into the matrix. Cross-linking agents are well known and it is well within the skill of those working in this art to select a suitable type and amount of cross-linking agent for the polymer. Examples of suitable agents include sulfur, trimethylthiuramide disulfide, and triphenylmethane 4,4'4"-triisocyanate It is also desirable to incorporate an antioxidant. Antioxidants are well known, and one example is STANTOFLEX 13.

The invention will now be explained with reference to the figures.

Using the above-discussed composite material it is possible to fabricate a conductive cable 1 as seen in FIG. 1 by an extrusion or coextrusion process (the detailed production process, using thermoplastic matrices, will be described in a following section). It is advisable to protect this cable with a porous layer 2 of the same polymer used in the composite matrix. This layer helps to protect the conductive cable from the environment and to exclude other environmental substances of different chemical nature from the solvent to be detected, preventing their coming into contact with the composite core material 1. Furthermore, because this layer 2 does not have conductive fillers which spoil its mechanical properties it is normally stronger than the conductive composite 1, fulfilling a reinforcing function too. Finally, this layer is preferably also slightly impregnated with substances which repel rodents and other animals, fungus, rot, plants and other microorganisms which could damage the cable.

In the case that the cable should be used in rough working conditions it is preferred to reinforce it with synthetic or metallic fibers (placed in an eccentric position to its axis or plane of symmetry, in such a way that they do not touch the conductive composite).

Figure 2:
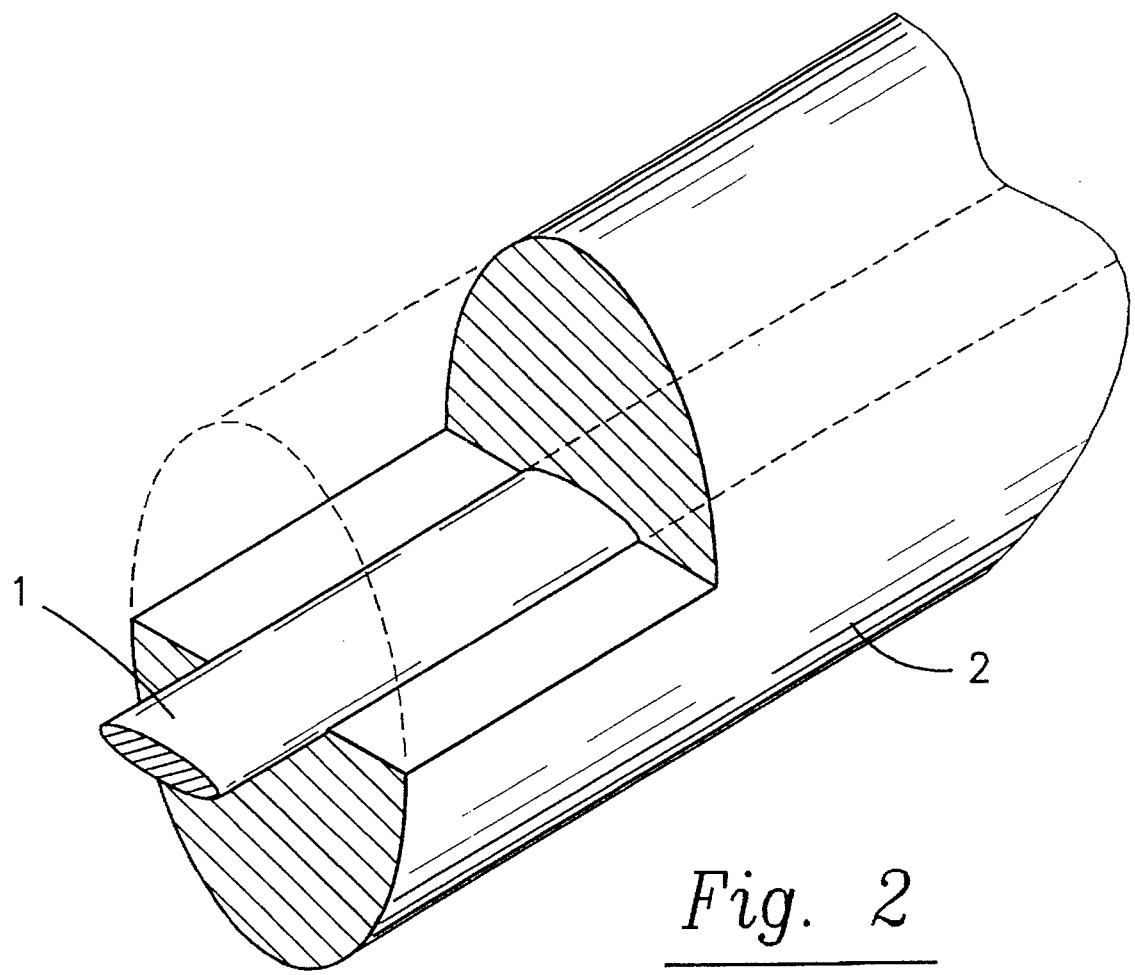
FIG. 2 shows a diagonal elevated view of a circular cross-sectional signal carrying composite cable according to the present invention.

FIGS. 1 and 2 show, schematically, the OSLEADER cable. FIG. 1 shows it with a rectangular cross-section, which is the most convenient geometry when the conductive composite material is being used as a thin film, and FIG. 2 shows it is being used in the form of a fiber. In both figures the composite material 1 is in the center of the cable, and the porous coating 2 surrounding it.

Figure 3:
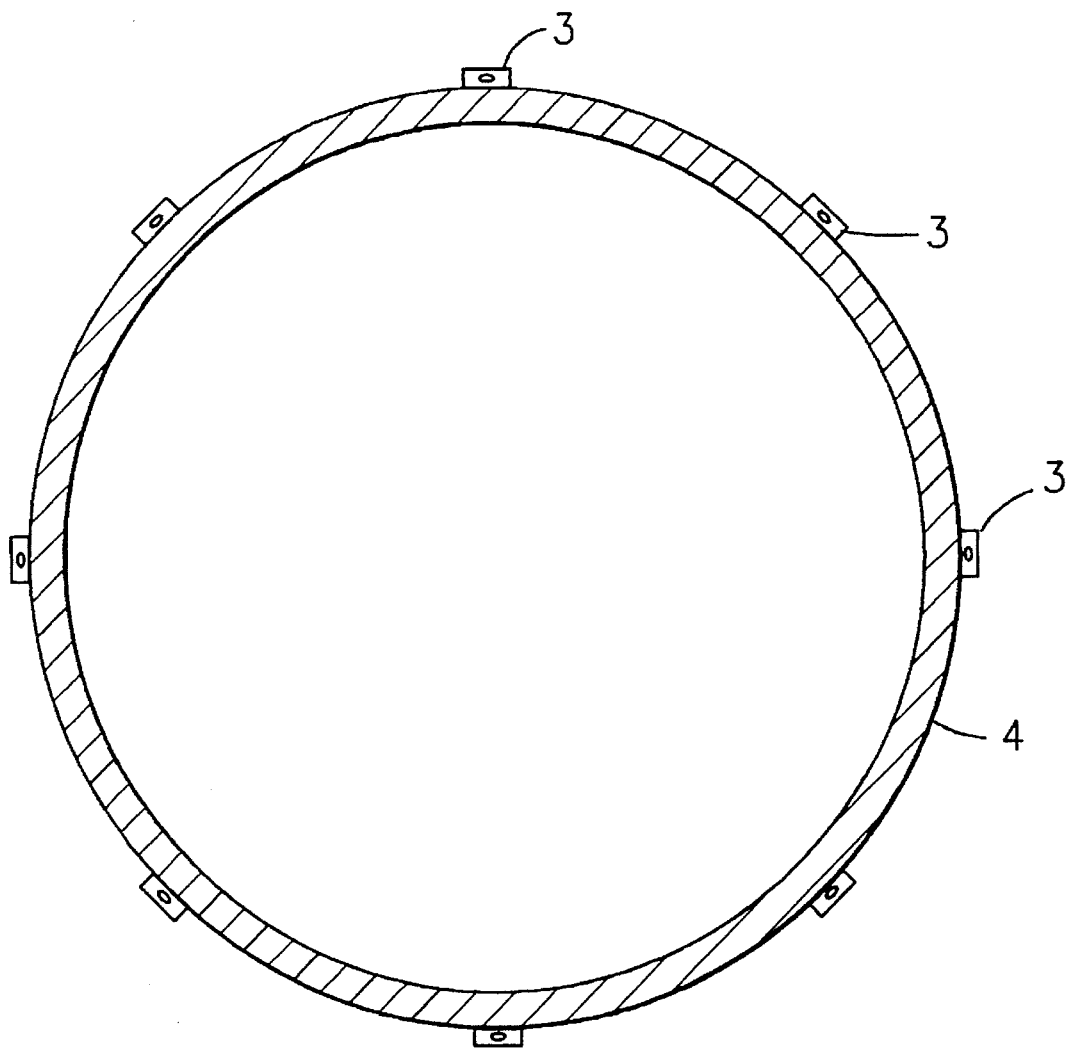
FIG. 3 is a cross-sectional diagrammatic representation of one possible arrangement of the cable of FIG. 1 around a pipeline.
Figure 4:
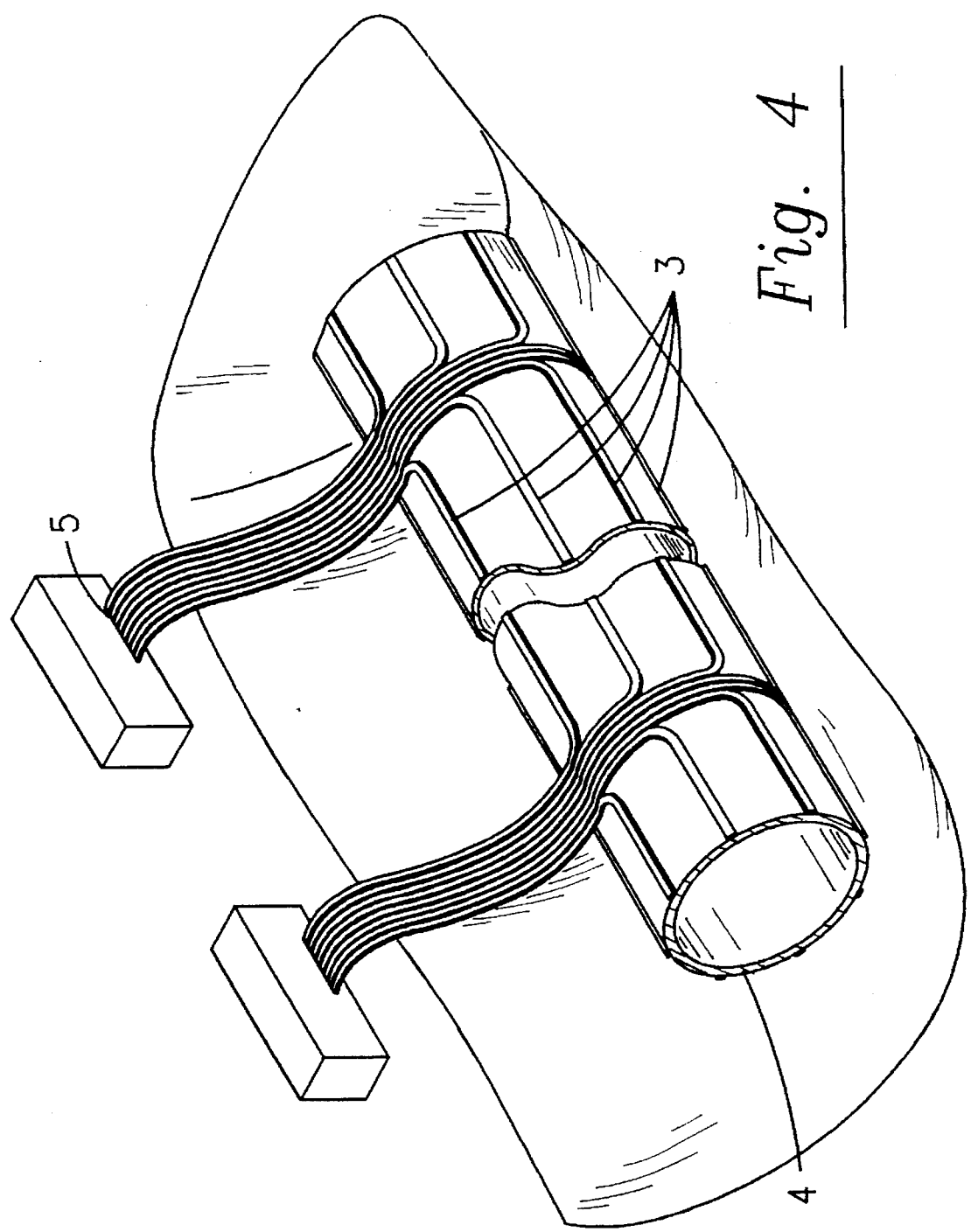
FIG. 4 shows monitoring terminals along a partially exposed underground pipeline.
Figure 5:
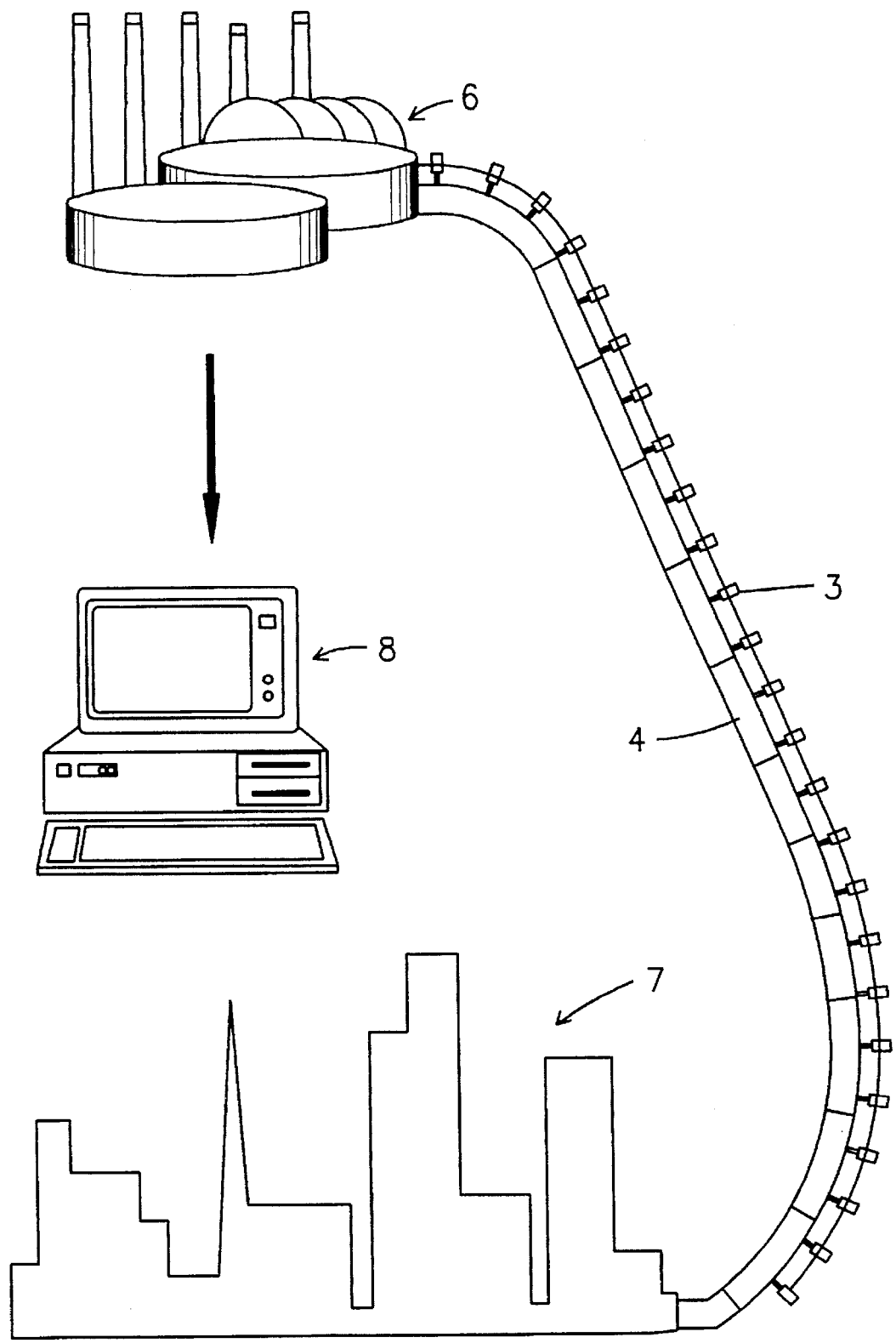
FIG. 5 schematically shows the monitored pipeline of FIG. 4 between an petrochemical plant and a city.

Regarding the positioning of these cables at or on the container to be monitored, FIG. 3 shows a possible distribution of the cable 3 around a pipeline 4. The devices can be fixed to the pipeline with a steel band or steel tape or adhesive tape. Should it be necessary to monitor a very long length of pipeline, the cables may be placed in a very extensive continuous line along the pipeline, since the cables can have an unlimited extension. However, in a preferred arrangement it would be convenient to install terminals 5 at set intervals in order to be able to short circuit or by-pass the line of devices during repairs or maintenance of one section (see FIG. 4) without affecting the whole length of the line. These devices can be placed in a line of detection along the pipelines, as shown in FIG. 5 from the production point 6 (e.g., petrochemical plant) to the consumption point 7 (represented in the figure by a city), or individually in convenient or strategic points or segments.

A process for the production of the OSLEADER cable will now be described.

As mentioned above, the polymer matrix must be chosen among those polymers that dissolve or swell in the organic solvent to be detected. The selected polymer should not be cross-linked in the raw state; however, it can be subsequently cross-linked during the manufacturing process. Concerning the conductive particles, they can be spherical or cylindrical (e.g. rods or short fibers) with a transverse diameter equal to or less than 0.5 mm, and their volumetric impedance is preferably be less than 10-1 ohms-cm.

The introduction of conductive particles into the matrix can be carried out mechanically or by dissolution. The first process can be easily done in a mechanical mixer, where the polymer is melted and stirred, and the particles are gradually added to the matrix until the desired composition is reached (in the case of copper powder it is important to use an inert atmosphere in order to avoid copper oxidation). Once the mixture is homogeneous it is extracted and converted into pellets. The second process can be accomplished by dissolving the polymer (with a solvent that can be the same one to be detected) and thereafter adding the particles until the desired composition is achieved. Subsequently the solvent is extracted and the mixture converted into pellets. In both processes, the particles may be "pre-wetted" with solvent in order to improve their ability to be taken up in the polymer. In both processes, in addition to electrically conductive particles., other conventional additives such as surfactants, stabilizers, compatibilisers, cross linking agents, lubricants, etc., can also be added.

Figure 6:
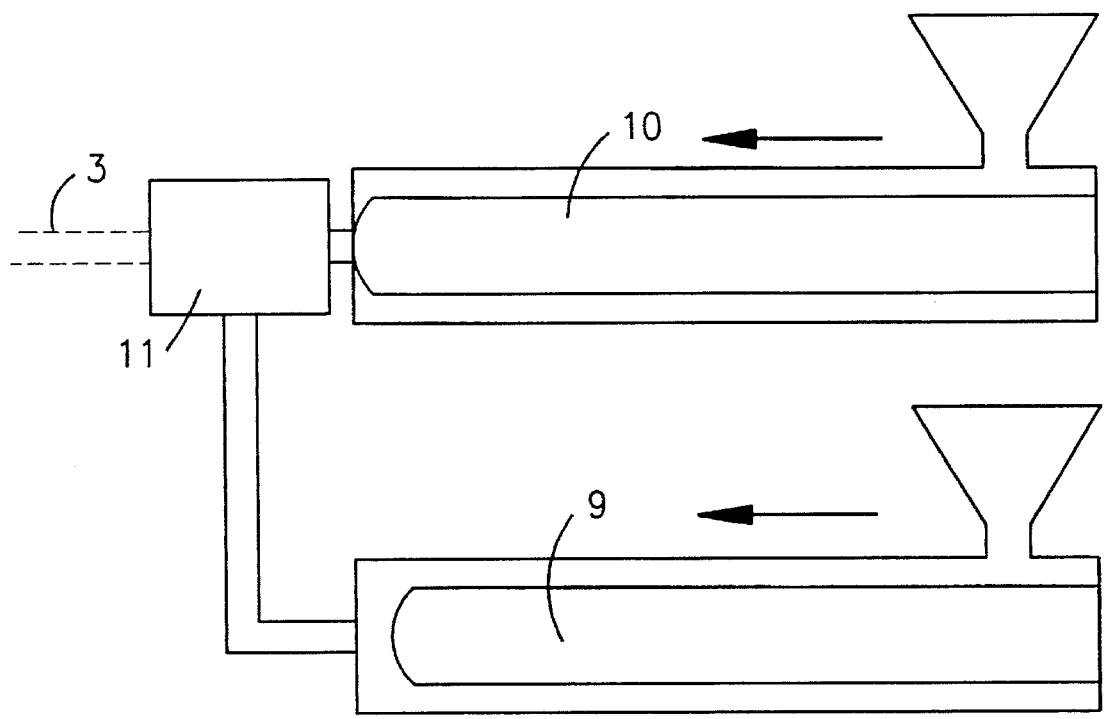
FIG. 6 schematically shows the co-extrusion production of the signal carrying composite cable.

The OSLEADER cable can be easily and economically produced by coextrusion of the conducting composite together with a porous coating, following a process similar to that used in the production of electric cables. This method is illustrated in FIG. 6. The process uses two extruders which in the figures are indicated as 9 and 10. It is recommended that the last 10 be a twin-screw extruder. It is highly desirable to previously dry all the raw materials at least for two hours at 105° C. before introduction into the extruders. The extruder 9 melts the conducting composite material and pushes it through a coextrusion die 11. It is important to assure that the pressure at the plasticoating zone of this extruder should be above 30 MPa in order to guarantee an efficient compaction of the conducting particles. On the other hand, the functions of the extruder 10 are; (a) to melt the material used for the porous coating; (b) to mix it with a blowing agent; (c) to control the foaming reaction; and (d) to push the expanded material through the die 11. The final form of the coextrudate can be as a flat or as a cylindrical cable. Once the OSLEADER cable comes out of the die it is cooled, dipped into rodenticide, wound and stored.

EXAMPLE

In order to illustrate the general fabrication process of the OSLEADER cables, the manufacture of one of these devices useful in the detection and localization of gasoline leaks is detailed below.

a Materials

An elastomeric commercial resin, polybutadiene, was chosen as the polymeric matrix for this example. Carbon black as the conductive component, and sulfonyl hydrazines (specially benzenesulfonyl hydrazine, OBSH) as the blowing agents to produce the porous layer. Finally, in order to dissolve the polybutadiene and to test the cable a commercial gasoline was utilized.

The polymeric conductor composite material was prepared in the following manner: In a mechanical mixer the polybutadiene resin was dissolved in gasoline. Once the polybutadiene was completely dissolved, the carbon particles were added in a proportion that produces a composite with a carbon black content 10 percent higher than the percolation composition. This mixture was stirred for 15 minutes at a set speed at room temperature. Subsequently, the gasoline was extracted and/or evaporated from the composite material using a centrifugal facility.

More specifically, once a homogeneous suspension is obtained, it is poured to the center of centerfugal equipment, which consists of two concentric cylinders of 10"and 12"joined to a circular basis that turns at 1500 rpm. The wall of the inner cylinder is constituted of a nylon fabric that permits the gasoline to pass through but retains the polymeric composite. The gasoline is expelled continuously and recollected in the external cylinder. After 15 min. of centerfuging the composite is removed from the nylon fabric and subjected to evaporation in a special chamber over 24 hours at room temperature.

Once all the gasoline has been completely extracted, the composite material was pelletized and stored at 25° C. with a 30 percent relative humidity.

The material for the porous coating was prepared in the following way: Pulverized pellets of the elastomer resin were mixed with the OBSH blowing agent in a solid mixer, at a suitable proportion, and stored at the same previous conditions.

b. Manufacturing Procedure:

As previously mentioned, the coextrusion of the OSLEADER cable is performed using basically extruders 9 and 10, as shown in FIG. 6, and a coextrusion die 11. For the present example, a two heating zone single-screw extruder was utilized as extruder 9, and a double-screw extruder also with two heating zones was utilized as extruder 10. Zone 1 is the upstream zone and zone 2 is the downstream one.

Figure 7:
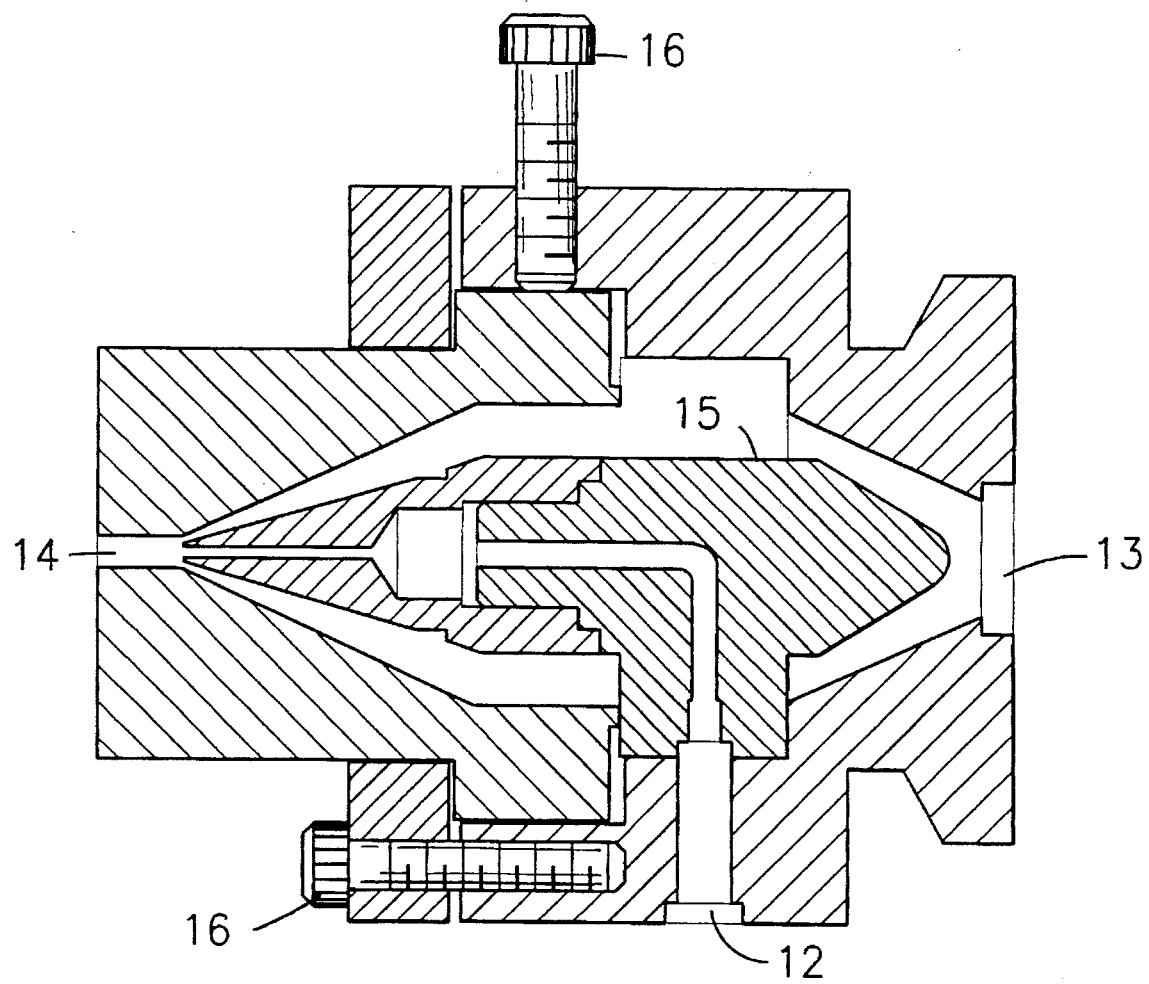
FIG. 7 is a cross-sectional view of an extrusion dye used in the co-extrusion of FIG. 6.

The coextrusion die, as shown in FIG. 7, was designed and manufactured in such a way to produce a coaxial cable with a total diameter of 3mm, with a porous coating thickness of 0.5mm and an inner diameter corresponding to conductor composite material of 2mm. This die has two inlets 12 and 13, the first one being for the conductor composite and the second one being for the coating material. A torpedo device 15 produces the flow distribution needed for to assure a perfect coating of the conductor cable that exits through the die tip 14. Finally, the centering of the die is performed using two center bolts 16.

The above-mentioned materials were coextruded under the following conditions:

| | | Temperatures (°C.) | | | |
| | | Barrel | | | |
| Extruder | Material | Zone 1 | Zone 2 | Die | RPM |
| --- | --- | --- | --- | --- | --- |
| A | Conductor Composite | 180 | 180 | 160 | 40 |
| B | Coating Compound | 180 | 160 | 160 | 50 |

Finally, once the cable has left the die its was air cooled., coiled and stored.

c. Cable Characteristics.

Figure 8:
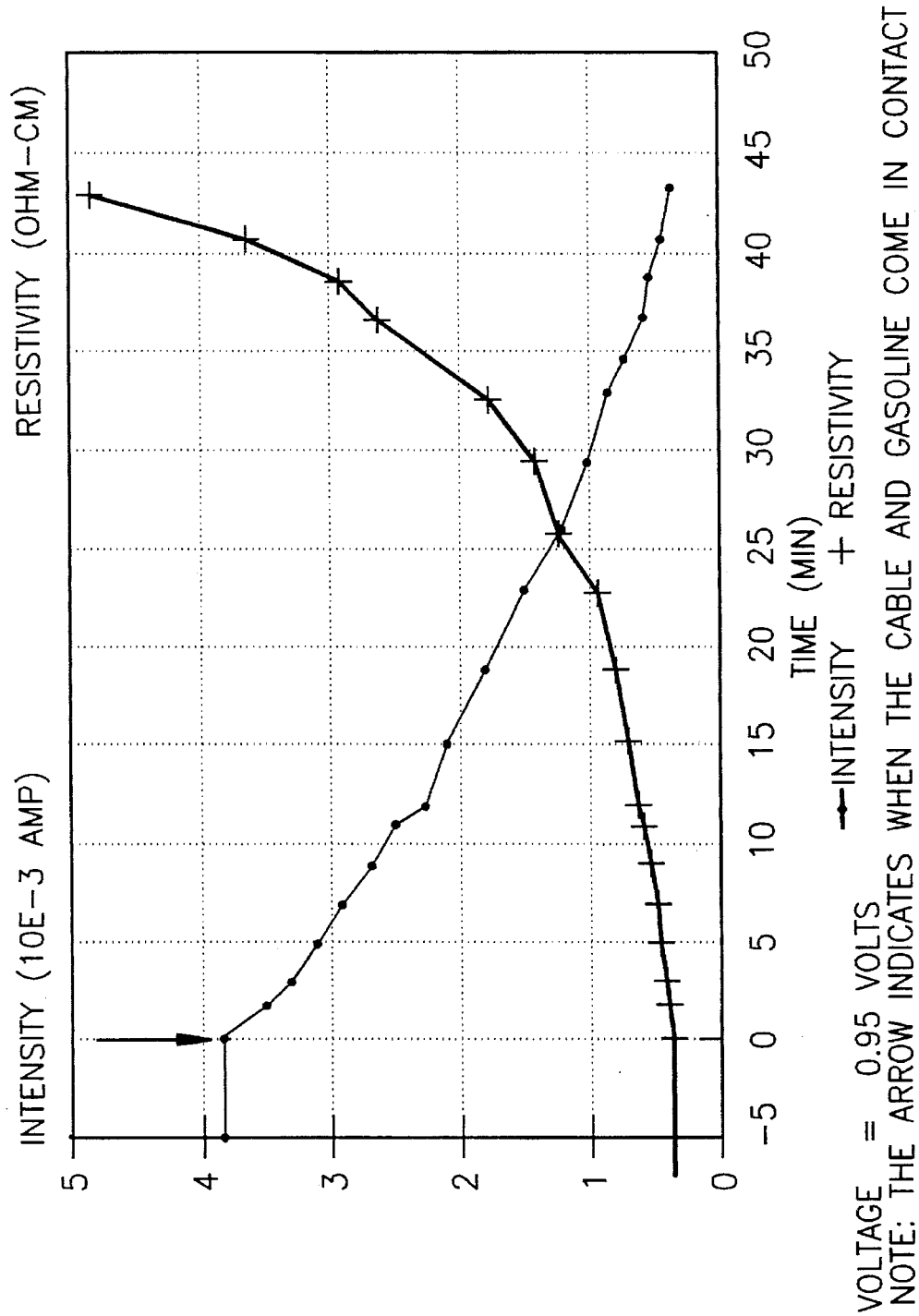
FIG. 8 graphically shows the electrical behavior of the cable before and after coming into contact with gasoline.

In order to measure the electrical characteristics of the thus-produced cable, it was connected to a constant voltage source and its resistivity was measured. Subsequently, a small area of the cable was sprinkled with gasoline at a low flow rate (10 centiliters per minute). The electrical behavior of the cable before and after coming into contact with gasoline is illustrated in FIG. 8. The resistivity of the cable was originally 0.35 ohm-cm, however, when it comes into contact with gasoline, its resistivity grows almost 10 times in 40 minutes. In the same figure, the electrical intensity corresponding to a voltage difference of 0.95 volts to the extremities of the OSLEADER cable is displayed. It is important to note that the intensity falls by 25 percent in only 5 minutes.

d. Description of the method to detect and localize organic solvent leakages using the OSLEADER cable connected to a "time domain reflectometer"

The above mentioned cable can be used as a component in several types of security systems. As an illustrative example, the following application is presented.

As shown generally in FIG. 5, with the help of electronic systems already available in the market 8, electric signals can be sent continuously along a line or cable of these devices previously fixed to pipelines or containers which transport or store organic solvents (such as gasoline). The time which the echo of these signals takes to return to the point of emission 6, when the pipelines or containers are intact, can be measured and calibrated for each of these lines. In the case that a small leak appears, the spilled solvent will come into contact with the OSLEADER cable 3, diminishing or abrogating its conductivity, which causes the echo of these signals to return to the point of departure in less time (simply because it has less distance to travel). This feature can be used for the warning of leaks and also to locate precisely their position (relating the return echo time, once the leak has been detected, with the time previously calibrated).

This type of system offers three great advantages over other detection systems; (a) It is very sensitive; (b) the location of the leak can be pinpointed easily and precisely; and (c) it is relatively inexpensive.

Figure 9:
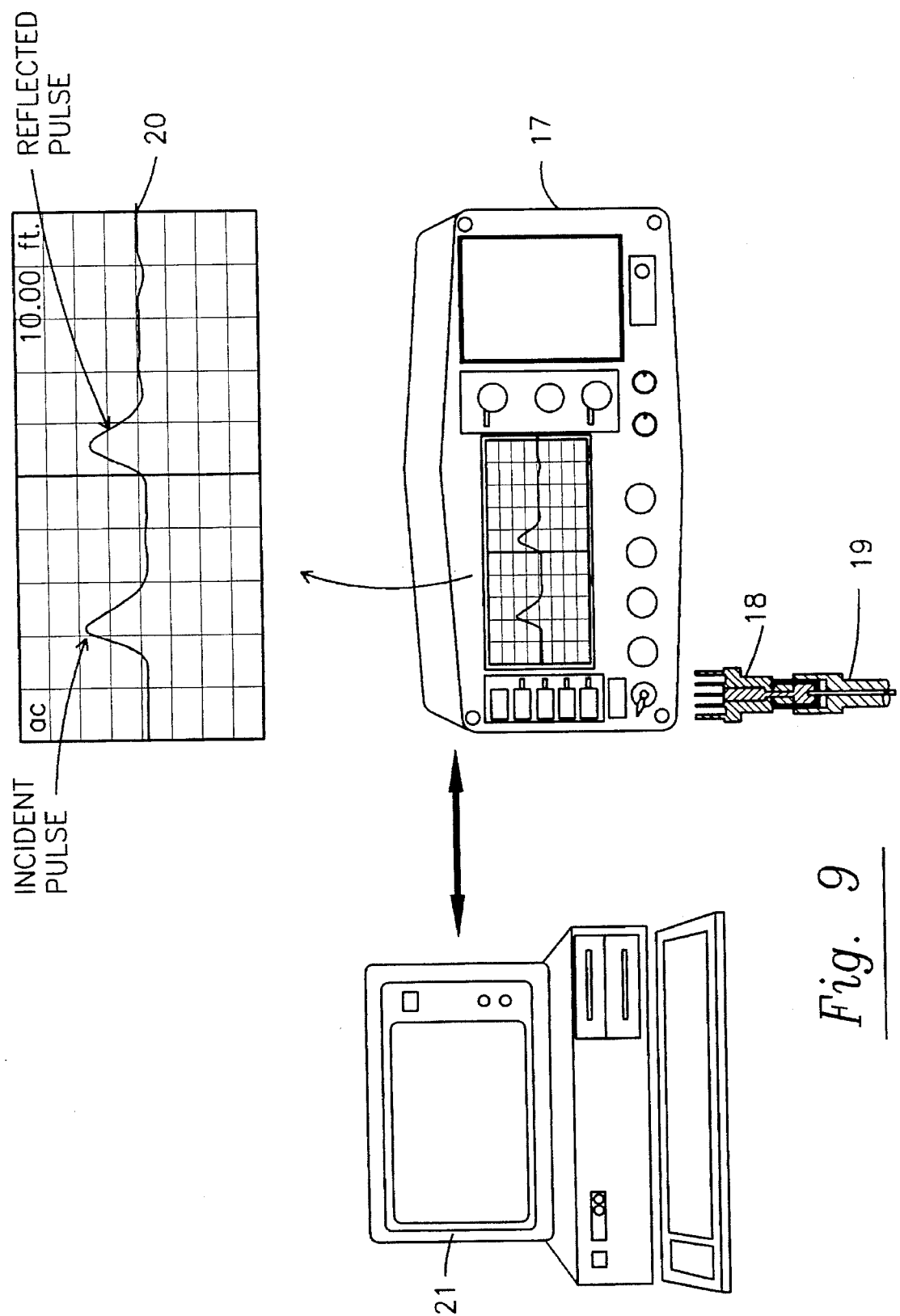
FIG. 9 shows schematically the system of detection and localization of organic solvent leaks using the cable connected to a time domain reflectometer and a computer.

FIG. 9 shows how to detect and localize organic solvent leakages using an OSLEADER cable and a "time domain reflectometer", popularly referred to as a digital time domain reflectometer or DTDR. The OSLEADER cable 19 is connected in short circuit to the reflectometer 17 using a special plug 18. The graphic 20 corresponding to the oscilloscope screen trace shows a typical display of the reflectometer during measurement. The pulse on the left is the text pulse (incident pulse) leaving the instrument. (Various waveforms can be used.) The pulse on the right is the reflected pulse, corresponding to the return echo. The distance between the two pulses is directly proportional to the time that it takes the echo to return, and it is also proportional to the cable length (with homogeneous impedance). The positions of both pulses, on the cable at the leak-free state of the field to be monitored, are stored in a signal processor such as a computer 21 interfaced with control logic for providing test impulses to the cable under test and for storing and analyzing the results, which signal processor is connected to the reflectometer.

If the cable comes in contact with an organic solvent (or fire, mechanical disruption, etc.) a decrease of the pulse reflected time is observed. The computer is programmed so that any such decreases in pulse return time or any change in the display curves activate the computer alarm (or an alarm integrated to the computer). The distance to the possible leak is evaluated by measuring the distance between both pulses in the reflectometer.

Although the system and device were first designed for measurement of organic solvent leakages, and particularly gasoline or other petrochemicals, and thus are particularly suited for use in industrial petrochemical refining or transporting operations, it will be readily apparent that the process is capable of other applications. Although this invention has been described in its preferred form with a certain degree of particularity with respect to the detection of gasoline leaks, it should be understood that the present disclosure of the preferred form has been made only by way of example and that numerous changes in the details of structures and the steps of process may be resorted to without departing from the spirit and scope of the invention.

Now that the invention has been described,

What is claimed is:

1. A device for detection of organic solvent leaks, said device comprising:

a polymeric electrically conductive cable, an electronic means for generating a signal, transmitting the signal through said electrically conductive cable, monitoring the signal that is reflected through said cable, and detecting changes in said reflected signal, wherein said cable comprises an electrically conductive composite material comprised of electrically conducting particles in a matrix of a polymer, said polymer soluble in or swellable by said organic solvent, said electrically conducting particles being present in at least such a proportion that the whole composite material becomes an electrical conductor, said cable losing part or all of its ability to transmit an electrical signal when in contact with said organic solvent, wherein said conducting particles are of a first size and a second size, said first size conducting particles being at least 80 times larger than said second size conducting particles, and wherein the total content of conductive particles in said composite material is within the range of 50% to 86% of the composite material by volume.

2. A device as in claim 1, wherein the total content of conductive particles in said composite material is within the range 60% to 86% of the composite material by volume.

3. A device as in claim 1, wherein said electrically conducting particles are selected from the group consisting of carbon black, graphite, silver, gold, bronze, brass, nickel, sponge irons, electrolytic irons, stainless steel, zinc, copper, conductive metal salts, and mixtures of the foregoing.

4. A device as in claim 1, wherein said polymers comprising the soluble or swellable matrix are selected from the group consisting of synthetic rubbers, silicone, Tygon R, polyvinyl chloride, polymethyl methacrylate, polybutadiene, polytetrafluoroethylene.

5. A device as in claim 4, wherein said polymers are selected from the group consisting of silicone, polybutadiene, and polytetrafluoroethylene.

6. A device as in claim 1, further comprising a protective jacket, said jacket having the same composition as the polymer matrix of the cable.

7. A device as in claim 1, wherein the proportion of said first size conducting particles to said second size conducting particles in their final volumetric fractions in the composite is from 2.5 to 2.8.

8. A device as in claim 7, wherein the size of said first size conductive particles is 200 microns or less, and the size of said second size conductive particles is 2.5 microns or less.

9. A device as in claim 1, wherein the content of conductive particles is within the range of from the electrical percolation concentration plus 10 percent by weight of particles, based upon the total weight of said particles, to the maximum packing.

10. A method for detection and localization of organic solvent leakages, the method comprising:

(a) placing an electrically conductive cable adjacent to the article to be monitored, said cable comprising an electrically conductive composite material comprised of electrically conductive particles in a matrix of a polymer soluble in or swellable by said organic solvent, said electrically conducting particles being present in at least such a proportion that exceeds by 10 percent by weight, based upon the total weight of said particles, the proportion at which the whole composite material becomes an electrical conductor, said cable losing part or all of its ability to transmit an electrical signal when in contact with said organic solvent;

(b) connecting the cable to an electronic means capable of generating a test pulse, monitoring a reflected signal, comparing the signal to previous signals, and triggering an alarm upon detecting changes in the reflected signal;

(c) causing said electronic means to generate periodic electrical pulses and transmit said electrical pulses through said cable;

(d) causing the electronic means to monitor the signals reflected by said cable for changes; and (e) causing the electronic means to trigger an alarm upon detection of changes in said reflected signal.

11. A method as in claim 10, wherein said electronic means is a time domain reflectometer.

12. An electrically conductive cable sensitive to an organic solvent, said cable comprising an electrically conductive composite comprised of electrically conducting particles in a matrix of a polymer soluble in or swellable by said organic solvent, said electrically conducting particles being present in at least an amount corresponding to the electrical percolation concentration, said cable losing part or all of its ability to transmit an electrical signal when in contact with an organic solvent, wherein said conducting particles are of a first size and a second size, said first size conducting particles being at least 80 times larger than said second size conducting particles, the first size conducting particles constituting 60–70% by volume of said composite, the second size conductive particles constituting 20–30% of said composite by volume.

13. A cable as in claim 12, wherein the content of conductive particles is within the range of from the electrical percolation concentration to the maximum packing.

14. A cable claim 12, wherein said electrically conducting particles are selected from the group consisting of carbon black, graphite, silver, gold, bronze, brass, nickel, sponge irons, electrolytic irons, stainless steel, zinc, copper, conductive metal salts, and mixtures of the foregoing.

15. A device as in claim 12, wherein said polymers comprising the soluble or swellable matrix are selected from the group consisting of synthetic rubbers, silicone, Tygon R, polyvinyl chloride, polymethyl methacrylate, polybutadiene, polytetrafluoroethylene.

* * * * *